United States Patent [19]
> Musial

[11] 4,236,415
[45] Dec. 2, 1980

[54] TRAVERSE MECHANISM AND METHOD
[75] Inventor: George J. Musial, W. Boxford, Mass.
[73] Assignee: Gear/tronics Corporation, North Billerica, Mass.
[21] Appl. No.: 49,957
[22] Filed: Jun. 19, 1979
[51] Int. Cl.³ ............................................. F16H 25/12
[52] U.S. Cl. ............................................. 74/25; 74/89
[58] Field of Search ............... 74/25, 89; 242/158.4 R

[56] References Cited
U.S. PATENT DOCUMENTS

| | | | |
|---|---|---|---|
| 2,283,393 | 5/1942 | Simons | 242/25 R |
| 2,539,667 | 1/1951 | King | 242/158.4 R |
| 2,578,026 | 12/1951 | Taylor | 74/25 |
| 2,940,322 | 6/1960 | Uhing | 74/25 |
| 3,475,972 | 11/1969 | Steibel | 74/25 |
| 3,673,874 | 7/1972 | Zaruba et al. | 74/25 |
| 3,719,333 | 3/1973 | Kubo | 242/158.4 R |
| 3,777,578 | 12/1973 | Swanberg | 74/89 |

FOREIGN PATENT DOCUMENTS

| | | | |
|---|---|---|---|
| 1116009 | 10/1961 | Fed. Rep. of Germany | 74/25 |
| 1116493 | 11/1961 | Fed. Rep. of Germany | 74/25 |
| 710135 | 6/1954 | United Kingdom | 74/25 |

*Primary Examiner*—Lawrence J. Staab
*Attorney, Agent, or Firm*—Pearson & Pearson

[57] ABSTRACT

A traversing mechanism converts rotary motion of a rotating shaft into reciprocating motion back and forth along the shaft by the provision of a carriage housing slidably mounted on the shaft and traversed by a friction roll. The friction roll is journalled in a gimbal type structure alongside the shaft and the gimbal ring is pressed against the shaft by a plurality of annular Belleville springs. The gimbal ring depends by a pair of pivoted links from its swivel shank to swing as it, and the friction roll are skewed at the end of the path by a reversing rod.

12 Claims, 4 Drawing Figures

TRAVERSE MECHANISM AND METHOD

BACKGROUND OF THE INVENTION

Traverse mechanisms are much used in lathes, drill presses, recording devices and winding devices. Such mechanisms may take the form of a single threaded shaft, or a pair of threaded shafts having a follower, or carriage threaded thereon so that rotation of the one causes reciprocation back and forth of the other. Exemplary of such threaded shaft mechanisms are the devices disclosed in U.S. Pat. No. 952,005 to Fetherolf of Mar. 15, 1910 and U.S. Pat. No. 2,234,274 to Prinz of Mar. 11, 1941.

It has also been proposed to convert the rotary motion of an elongated shaft into reciprocating motion by the use of a friction, or "skew", roll which rocks, or swings first with one peripheral edge in angular contact with the shaft surface and then with the other peripheral edge in contact with the shaft surface. The friction rolls of the prior art have been journalled in a yoke, or fork, of a swivel shank turnable on its axis in a support, there being a coil spring between the support and yoke to press the roll in a direction normal to the shaft axis.

In U.S. Pat. No. 334,809 to Robinson of Jan. 26, 1886 the friction roll is supported in a swivel which is rocked to skew the roll and in U.S. Pat. No. 2,283,393 to Simons of May, 1942 the friction roll arm, or tiller, is oscillated by electro magnetism to skew the roll.

A tiller arm, which strikes spaced stops, is used to skew the friction roll in U.S. Pat. No. 2,539,667 to King of Jan. 30, 1951. A similar arm is used to skew the annular frictional drive gears disclosed in U.S. Pat. No. 2,940,322 to Uhing of June 14, 1960.

All of the above friction roll type traverse mechanisms are characterized by the friction roll being journalled in, or otherwise rotatable in, the yoke, or ring, of a swivel, the yoke being turnable on the axis of a swivel shank and the axis of the shank being normal to the axis of the shaft.

SUMMARY OF THE INVENTION

This invention is of the swivel yoke, swivel shank, friction roll type, but instead of the swivel shank being normal to the shaft axis, it depends from the carriage housing with it's shank axis in a vertical plane spaced from, but in parallelism with, a vertical plane through the longitudinal central axis of the shaft.

In addition the friction roller is journalled in a ring which is connected to the shank by a pair of parallel pivoted links so that the ring is in a plane parallel to the said vertical plane of the shaft axis and is free to swing in that plane in the manner of a pendulum.

The carriage housing of the invention includes an upper wall and at least one side wall and the ring, or gimbal, is resiliently and yieldably urged toward the shaft by spring means in the form of a plurality of Belleville annular springs between the side wall and the ring. Thus the friction roll is pressed against the shaft with predetermined pressure. A roller bearing is positioned between the side wall and the Belleville springs to permit slight rotation during the skew of the friction roll.

A reversing rod is slidably mounted in the carriage housing so that each opposite end will contact one of a pair of stops and the centre of the rod is connected to the bottom of the gimbal ring to resiliently shift its angular position to reverse the path of the carriage.

DESCRIPTION OF THE PREFERRED EMBODIMENT

Figure 1:
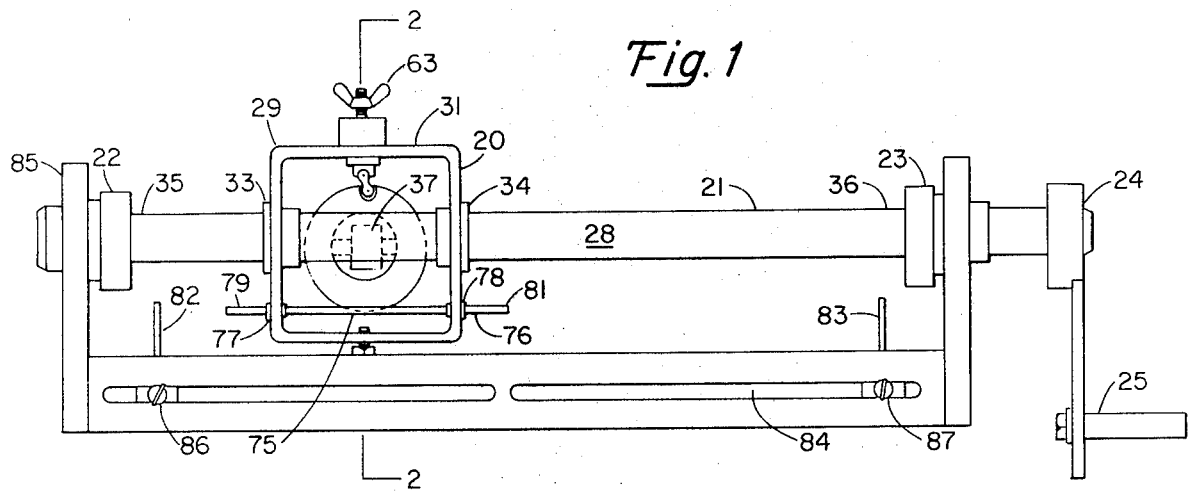
FIG. 1 is a side elevational view of the traverse mechanism of the invention.
Figure 2:
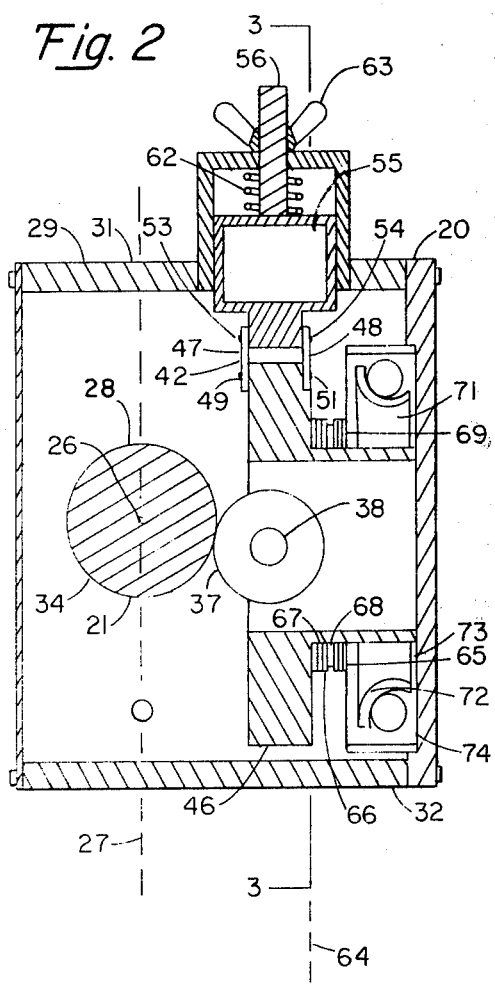
FIG. 2 is an end elevational view, on an enlarged scale in section on line 2—2 of FIG. 1.
Figure 3:
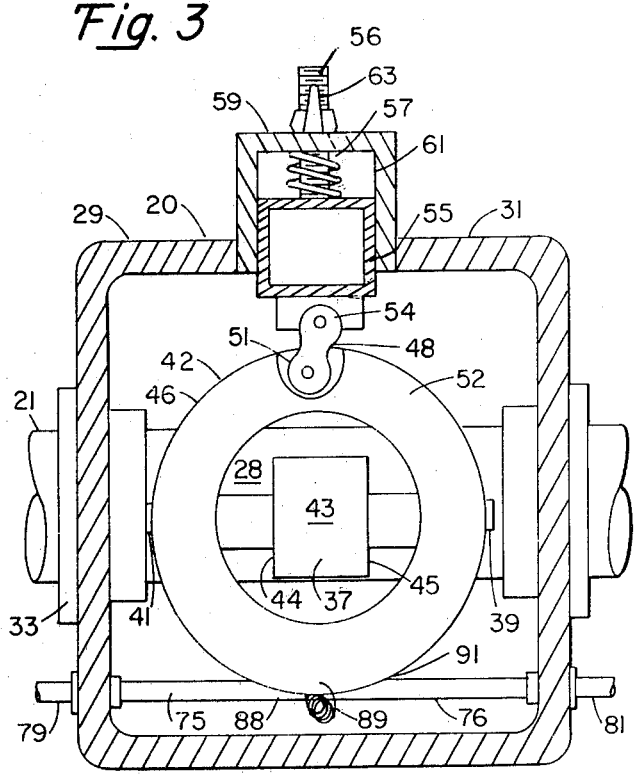
FIG. 3 is a side elevational view similar to FIG. 2, in section on line 3—3 of FIG. 2.
Figure 4:
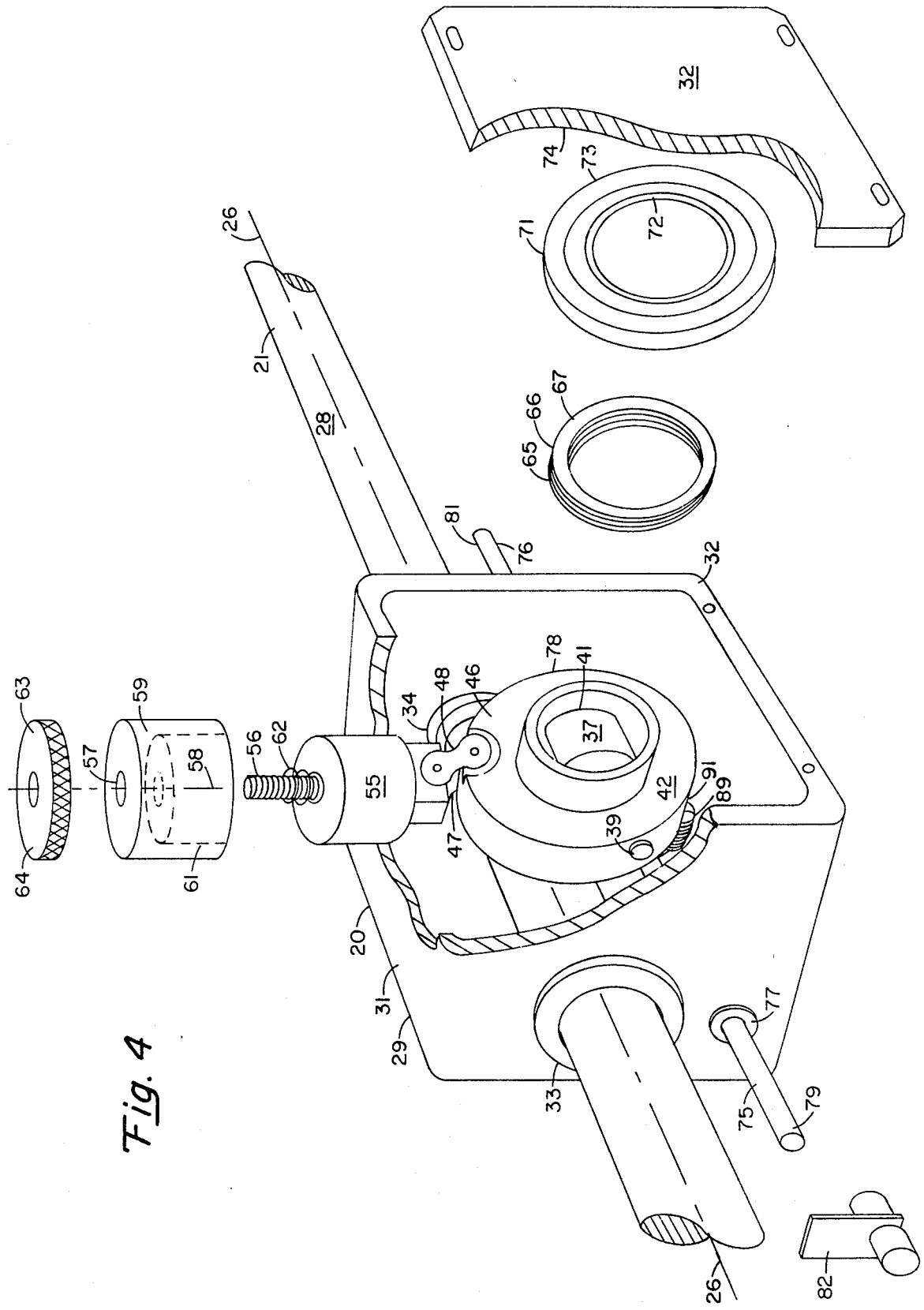
FIG. 4 is an exploded, perspective, schematic view of the traverse mechanism of the invention.

As shown in FIG. 1 the traverse mechanism 20 of the invention is mounted on an elongated shaft 21, rotated unidirectionally in suitable bearings 22 and 23 by a suitable drive train such as the crank 24 and handle 25. The central longitudinal axis of shaft 21 is designated 26, the vertical plane in which the shaft axis is located is designated 27 and the smooth circumferential surface of the shaft is designated 28.

The traverse mechanism 20 includes the carriage housing 29, having an upper wall 31, side wall 32 and smooth bores 33 and 34 so that the carriage housing is slidably movable along the shaft from one end 35 to the other end 36.

A friction roll, or "skew" roll, 37 on roll shaft 38, is journalled at 39 and 41 in gimbal means 42, the roll 37 having a smooth circumferential face 43 and opposite, peripheral edges 44 and 45.

The term "gimbal" is used to describe the loose suspension of roll 37 as compared to the swivel shank and yoke structures of the prior art wherein the roll is able to turn on the shank axis or move axially on the shank axis but cannot move out of the shank axis. As will be explained hereinafter, the swivel shank and yoke of this invention is able to swing, twist and turn in a compound motion relative to the shaft while the roller is spring pressed against the surface of the shaft.

The gimbal means 42 includes the annular yoke or ring 46 in which roll 37 is journalled, there being a pair of parallel links 47 and 48 pivoted at their lower ends 49 and 51 to the upper portion 52 of the ring and pivoted at their upper ends 53 and 54 to a plunger 55. The plunger 55 is connected to the threaded shank 56 which is turnable in aperture 57 on its shank axis 58 in a holder 59. The holder 59 includes a recess 61 in which plunger 55 is axially slidable, there being a coil spring 62 urging the plunger downwardly in the recess and a wing nut 63 threaded on shank 56 for moving the plunger 55 upwardly against spring pressure so that a precise location of roll 37 relative to shaft 21 may be obtained.

It should be noted that the swivel shank 56 and the swivel ring, or yoke, 46 extend vertically in a plane 64 parallel to, and spaced from, the vertical plane 27 passing through the axis 26 of shaft 21 so that the roll 37 is suspended alongside shaft 21 and able to swing on the links 47 and 48 in the vertical plane 64.

Spring means 65 is provided in the form of a plurality of annular springs 66, of the "Belleville" type, there being preferably a set of three springs at 67, an annular, central, shim 68 and a set of three springs 69 all substantially equal in diameter to the diameter of the ring 46. The spring means 65 bears against a rotary roller bearing 71, having an inner race 72 and an outer race 73, the outer race 73 fitting in a suitable recess 74 in the side wall, or cover, 32 of carriage housing 29.

It will be seen that the annular spring means 66 presses the ring, or yoke 46 of gimbal means 42 resiliently and yieldably toward the axis 26 of rotating shaft 21 under predetermined pressure while permitting the ring and its friction roll to skew at the end of the path of the carriage housing. The bearing 71 permits a slight rotation of the Belleville springs in either angular direction and the links 47 and 48 permit movement of the ring and roll 37 in the plane 64 in the manner of a pendulum.

Reversing rod means 75 is provided including the reversing rod 76 slidable in the bores 77 and 78 in carriage housing 29 with the ends 79 and 81 protruding therefrom in the path of stops 82 and 83. Stops 82 and 83 are slidable in an elongated slot 84 in frame 85 and may be affixed by set screw 86 and 87 to establish the length of reciprocatory path desired. The central portion 88 of rod 76 is connected by a coil spring 89 to the lower portion 91 of ring 46 so that contact of an end of the rod with a stop, resiliently urges the yoke to skew the roll so that first one peripheral edge 44 and then the other peripheral edge 45 frictionally contacts the surface 28 of the rotating shaft to convert the rotary motion of the shaft into reciprocating motion of the carriage housing 29.

The traverse mechanism 20 of the invention can be used wherever a back and forth motion is required such as in reeling up wire, hose, tape or similar strands. The sandwiching of the Belleville springs 66 and ball bearing 71 between the coverwall 32 and the gimbal ring 46 loads the friction roll 37 in the gimbal ring 46 against the shaft 21 while still allowing the roller 37 to swivel freely. The upper portion 52 of the gimbal 46 is connected through pivoted links 47 and 48 to the spring loaded plunger 55 which can move axially in its holder 59.

The pitch, or helix of the roller 37 on the shaft 21 is determined by the distance the plunger 55 can move. The adjusting nut 63 on the end of the threaded shank 56 of the plunger 55 controls this movement, with full in position making the angle zero. Turning the adjusting nut 63 makes the angle larger resulting in more movement per revolution of the shaft 21.

The lower portion 91 of the gimbal ring 47 is connected to the reversing rod 76 by an extension spring 89. The movement of the carriage housing 29 along the shaft 21 forces the reversing rod 76 against an adjustable stop such as 82. This movement loads the extension spring 89 until at some point it overcomes the load of the plunger spring 62 and through a toggle action, snaps the gimbal ring 47 over to a reverse position.

In place of the Belleville springs 66, a set of four coil springs, one in each quadrant could be used, but I prefer the annular springs.

The three springs at 67 are concave and the three springs at 69 are convex, so as to apply a force of about fifty to ninety pounds to press the roll 37 against the shaft 21. The surface of the roll and shaft is hard so as to avoid reduction of the pressure contact by inadvertent compression of materials.

I claim:

1. A traverse mechanism of the type including a carriage mounted to move longitudinally back and forth relative to an elongated rotating shaft a swivel mounted on said carriage, said swivel including a yoke and a shank with the shank rotatable around its axis in, and spring biased in the carriage, a friction roll journalled in the yoke of the swivel in frictional contact with the rotating surface of the shaft and there being stops to limit the path of the carriage by skewing the roll at each opposite end of the path said mechanism being characterized by the shank of said swivel extending in a plane normal to the longitudinal axis of said shaft and being nonconcurrent with said longitudinal axis to position said swivel yoke and friction roll alongside said shaft means, associated with said swivel yoke and shank, for enabling said roll to swing in an arc in a plane parallel to the longitudinal of said shaft and spring means in said carriage for resiliently urging said yoke and friction roll into frictional contact with the surface of said shaft.

2. A traverse mechanism as specified in claim 1 wherein said yoke is a ring in which said friction roll is journalled and said means includes a pair of parallel links, pivotally connecting said ring to the shank of said swivel and supporting said ring in a plane parallel to the plane of said shaft for oscillation in that plane.

3. A traverse mechanism as specified in claim 2 wherein said spring means comprises a plurality of annular springs of the Belleville type, said springs being mounted in said carriage to resiliently and yieldably urge said ring toward said shaft.

4. A traverse mechanism as specified in claim 3 wherein said spring means includes an annular bearing, substantially equal in diameter to the diameter of said annular springs and mounted in said carriage to contact said springs and permit slight rotation thereof during the skewing of said roll at each opposite end of said path.

5. A traverse mechanism as specified in claim 1 wherein said shank of said swivel comprises a plunger slidable in a cylinderical recess in a holder, a coil spring between said plunger and the bottom of said recess to urge said plunger in one direction and threaded means for moving said plunger in the other direction to compress said spring, whereby a precise adjustment of the location of the yoke and roller relative to said shaft may be made.

6. A traverse mechanism as specified in claim 1 wherein said carriage includes reversing rod means comprising an elongated rod slidable therein, in parallelism with said shaft, and having its opposite ends protruding from said carriage to endwise contact one of said stops at each end of said path and a coil spring connecting said rod to said gimbal means for resiliently and yieldably urging said gimbal means to skew said friction roll to reverse the path of said carriage.

7. A traverse mechanism for converting the rotary motion of an elongated rotating shaft into reciprocating motion longitudinally of the shaft said mechanism comprising a carriage housing slidably movable along said shaft, said housing having an upper wall and at least one side wall;

a ring loosely suspended, alongside said shaft within said carriage, from a shank rotatable on its' longitudinal axis in said upper wall said longitudinal axis extending in a plane normal to the axis of rotation of said rotating shaft and being non-concurrent with said axis of rotation;

a friction roll journalled in said ring with its circumferential surface in frictional contact with the circumferential surface of said shaft, spring means between said ring and the said side wall of said housing for resiliently and yieldably urging said roll into contact with said shaft and reversing rod means associated with said carriage for skewing said friction roll at each end of the path of said carriage to reverse the travel thereof.

8. A traverse mechanism as specified in claim 7 wherein:

said ring is loosely suspended by means of a pair of parallel links, each pivoted at the lower end to the top centre of said ring and each pivoted at the upper end to said shank, whereby said ring may oscillate in an arc in a plane parallel to the plane of said shaft.

9. A traversing mechanism as specified in claim 7 wherein:

said reversing rod means includes an elongated reversing rod, mounted for slidable movement, in parallelism with said shaft in the lower portion of said carriage housing a pair of stops, each in the path of an opposite end of said rod, to establish the predetermined reciprocal travel of said carriage housing and a coil spring connecting the central portion of said reversing rod to the lower portion of said ring for resiliently urging said ring to twist on the axis of said shank to skew said roll.

10. The method of traversing a carriage housing back and forth along a rotating shaft to convert the rotary motion of the shaft to reciprocating motion of the carriage by means of a friction roll journalled in the yoke of a swivel to engage the surface of the shaft, the swivel yoke having a swivel shank, which comprises the steps of;

supporting said yoke and roll alongside said shaft for movement of said roll surface toward and away from said shaft surface; for movement in an arc in a plane parallel to, but spaced from, the shaft and for movement around the axis of the shank of the swivel yoke said shank axis being non-concurrent with the axis of rotation of said shaft; and resiliently and yieldably urging said swivel yoke toward said shaft with predetermined spring pressure to create predetermined friction between said roll and shaft;

and resiliently and yieldably skewing said roll, to reverse the angle of contact thereof with said shaft, at the end of each back and forth reciprocation thereof.

11. In a traversing mechanism of the type having a carriage slidable on a rotating shaft; a skew roller in the carriage in frictional contact with the shaft and reversing mechanism for reversing the angle of skew at the opposite ends of the shaft to reciprocate the carriage the combination of:

gimbal means in said carriage, supporting the skew roller alongside the shaft to rotate on an axis substantially parallel to the axis of the shaft while swiveling on a swivel axis which is non-concurrent with the axis of said rotating shaft and spring means in said carriage continually urging said gimbal means toward said shaft in a direction normal to the axis thereof to create a predetermined frictional pressure therebetween.

12. Traversing mechanism as specified in claim 11 wherein said reversing mechanism includes a reversing rod slidable in said carriage in parallelism with said shaft, stops in the path of each opposite end of said rod and a spring connecting the central portion of said rod to the lower portion of said gimbal means.

* * * * *